(12) United States Patent
Koutsimanis et al.

(10) Patent No.: US 10,165,524 B2
(45) Date of Patent: Dec. 25, 2018

(54) METHOD AND APPARATUS FOR UPLINK AND/OR DOWNLINK POWER CONTROL IN A RADIO COMMUNICATION NETWORK

(71) Applicant: Telefonaktiebolaget LM Ericsson (publ), Stockholm (SE)

(72) Inventors: Chrysostomos Koutsimanis, Stockholm (SE); Panagiota Lioliou, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/104,588

(22) PCT Filed: Dec. 16, 2013

(86) PCT No.: PCT/SE2013/051516
§ 371 (c)(1),
(2) Date: Jun. 15, 2016

(87) PCT Pub. No.: WO2015/094026
PCT Pub. Date: Jun. 25, 2015

(65) Prior Publication Data
US 2016/0374030 A1    Dec. 22, 2016

(51) Int. Cl.
*H04W 52/34* (2009.01)
(52) U.S. Cl.
CPC .................. *H04W 52/343* (2013.01)
(58) Field of Classification Search
None
See application file for complete search history.

(56) References Cited

U.S. PATENT DOCUMENTS

| 6,628,956 | B2 | 9/2003 | Bark et al. | |
| 8,169,933 | B2 * | 5/2012 | Srinivasan | H04W 16/08 370/253 |
| 8,285,216 | B2 | 10/2012 | Malladi et al. | |
| 2009/0163223 | A1 * | 6/2009 | Casey | H04W 36/22 455/453 |
| 2011/0211560 | A1 * | 9/2011 | Yamamoto | H04W 36/20 370/332 |
| 2012/0120806 | A1 * | 5/2012 | Jeon | H04W 28/08 370/235 |
| 2012/0225688 | A1 * | 9/2012 | Yamazaki | H04L 5/0035 455/522 |
| 2015/0245347 | A1 * | 8/2015 | Yi | H04L 5/001 370/280 |
| 2015/0358925 | A1 * | 12/2015 | Nobukiyo | H04W 16/32 455/522 |

FOREIGN PATENT DOCUMENTS

| WO | 2008055132 A2 | 5/2008 | |
| WO | WO 2013024352 A2 * | 2/2013 | H04W 52/10 |

* cited by examiner

*Primary Examiner* — Mohammed Rachedine
(74) *Attorney, Agent, or Firm* — Murphy, Bilak & Homiller, PLLC

(57) ABSTRACT

An apparatus and a method for uplink and/or downlink power control in a radio communication network are provided. The method comprises determining (120) a relationship between a load of a serving wireless access point and a load of at least one neighboring wireless access point; and determining (130) an uplink or downlink transmission power based on the determined load relationship.

26 Claims, 8 Drawing Sheets

METHOD AND APPARATUS FOR UPLINK AND/OR DOWNLINK POWER CONTROL IN A RADIO COMMUNICATION NETWORK

TECHNICAL FIELD

The present disclosure relates to transmission power control in uplink and/or downlink in a radio communication network.

BACKGROUND

This disclosure relates to the area of Uplink Power Control, UL PC, and Downlink Power Control, DL PC. UL PC and DL PC are relevant for several different Radio Access Technologies, RATs. The solutions described herein will be exemplified with regards to Long Term Evolution, LTE, wireless networks but the solutions are applicable to other types of wireless communication networks or RATs as well.

In wireless communication networks, the UL is typically a challenging link, where the available scarce energy of a wireless device, e.g. a User Equipment, UE, must be used to compensate for the losses of the channel (distance dependent pathloss, shadow fading, fast fading, etc.). Moreover, the interference produced by any UL transmissions in a multi-cell environment is also another limiting factor for the UL performance. One way to use efficiently the available energy at the UE is to control the UL transmit power. UL power control can be used on both data and control channels. Also the DL may be a challenging link. A wireless access point, e.g. an eNodeB or Radio Base Station, RBS, may not be limited with regards to transmission power, but the interference situation may cause the wireless access point to moderate its DL transmission power accordingly.

UL power control in LTE is a topic discussed earlier and part of already the first $3^{rd}$ Generation Partnership Project, 3GPP, LTE standard release, e.g. Rel. 8. According to the standardised method, UL PC is typically based on compensating the pathloss to the connected cell. For example, a UE which is close to the BS will use less transmit power with respect to a UE which is close to the cell edge. This power control principle does not take into account any impact of the selected transmit power on surrounding (or interfered) cells.

The UL and DL power control may become even more intricate in heterogeneous networks, where different wireless access points of different downlink transmission powers are employed. The size of the respective coverage areas, also referred to as cells, for wireless access points of different downlink transmission powers may vary substantially and also the total number of UEs, the density (i.e. the number of UEs per area unit of a cell) may vary substantially. Uplink power control in such heterogeneous networks plays an important role: it balances the need for sufficient transmit power to maintain the required Quality-of-Service, QoS, against the need to control inter-cell interference and maximise the UE battery life.

In achieving this goal, an efficient power control algorithm has to adapt to the characteristics of the radio propagation channel by taking into account path-loss or geometry conditions as well as overcoming interference from other users in neighbouring cells.

In LTE, uplink power control is a combination of two terms: a basic open loop operating point for compensating slow changes in pathloss, and a closed loop mechanism consisting of explicit control commands transmitted in the downlink for user specific power adjustments.

According to 3GPP, the transmit power target per resource block (PR) for PUSCH transmission can be evaluated as $PSD_{TX}=P_0+\alpha PL+\delta_{CL}$, where $P_0$ is the received power target (user or cell specific), $\alpha$ is the path-loss compensation factor (cell specific), PL is the downlink path-loss measured by the UE and $\delta_{CL}$ is the closed loop component.

Since the parameters $P_0$ and a determine the open loop operating point, they can be used by the operator to control the uplink power. Therefore, different choices of the parameters $P_0$ and a can lead to different UL power control configurations.

In single-cell configurations, the parameters that define the open loop operating point are set by utilizing information related only to the serving cell. The most common single-cell configurations are the pathloss-based power control method, which is also the 3GPP baseline, and the load based power control method.

The fractional path-loss compensation factor $\alpha$ is a cell-specific parameter that can be seen as a tool to control the trade-off between cell-edge data rate and total uplink capacity.

Uplink power control with $\alpha=1$ corresponds to full path-loss compensation. Full path-loss compensation maximizes fairness for cell-edge users by adjusting the UL power so that the received power remains constant.

On the other hand, by setting $\alpha<1$ the UE compensates only a fraction of pathloss when setting the transmit power. In this way, fractional pathloss compensation (FPC) can improve the total system capacity in the uplink by assigning relatively lower transmit power to the terminals close to the cell border (higher path-loss), so that cell-edge UEs cause less inter-cell interference. Typically, path-loss compensation factors around 0.8 have been shown to give a close-to-optimal uplink system capacity without degrading significantly the cell-edge data rate.

An assumption in Fractional Power Control, FPC, is that UEs with low pathloss can increase their transmit PSD without causing too much interference. However, this assumption is only valid in homogeneous scenarios. For example, in scenarios with mixed indoor and outdoor users, increasing the power of an outdoor UE with relatively low pathloss can cause strong interference to a neighbouring indoor UE that has relatively high pathloss. In this case, it is highly possible that the indoor UE becomes power limited when it is close to the cell border and has no power to boost Signal to Interference and Noise Ratio, SINR.

SUMMARY

The object is to obviate at least some of the problems outlined above. In particular, it is an object to provide an apparatus and a method for uplink and/or downlink power control in a radio communication network. These objects and others may be obtained by providing an apparatus and a method performed by an apparatus according to the independent claims attached below.

According to an aspect a method for uplink and/or downlink power control in a radio communication network is provided. The method comprises determining a relationship between a load of a serving wireless access point and a load of at least one neighbouring wireless access point; and determining an uplink or downlink transmission power based on the determined load relationship.

According to an aspect, an apparatus adapted for uplink and/or downlink power control in a radio communication network is provided. The apparatus comprises a processor and a memory, the memory comprising instructions which when executed by the processor causes the apparatus to determine a relationship between a load of a serving wireless access point and a load of at least one neighbouring wireless access point; and to determine an uplink or downlink transmission power based on the determined load relationship.

According to yet an aspect, an apparatus for uplink and/or downlink power control in a radio communication network is provided. The apparatus comprises a determining unit for determining a relationship between a load of a serving wireless access point and a load of at least one neighbouring wireless access point, and for determining an uplink or downlink transmission power based on the determined load relationship.

The method and the apparatus performing the method may have several advantages. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The impact on the current LTE standards is minimal or even none. The solution may be implemented as a proprietary feature. Still further, the solution may be part of Self Organising Network, SON, algorithms.

BRIEF DESCRIPTION OF DRAWINGS

Embodiments will now be described in more detail in relation to the accompanying drawings, in which.

DETAILED DESCRIPTION

Briefly described, an apparatus and a method performed thereby for uplink and/or downlink power control in a radio communication network are provided. The apparatus can be a wireless device and/or a wireless access point, and hence the method may be performed by a wireless device and/or a wireless access point. Non-limiting examples of a wireless device are a UE, a mobile telephone, a laptop, a personal digital assistant or any other device comprising means for wireless communication with a communication network via an access point. Non-limiting examples of wireless access points are a Radio Base Station, RBS, an eNodeB, a Base Station, a Base Station Controller, and a Radio Network Controller.

Figure 1A:
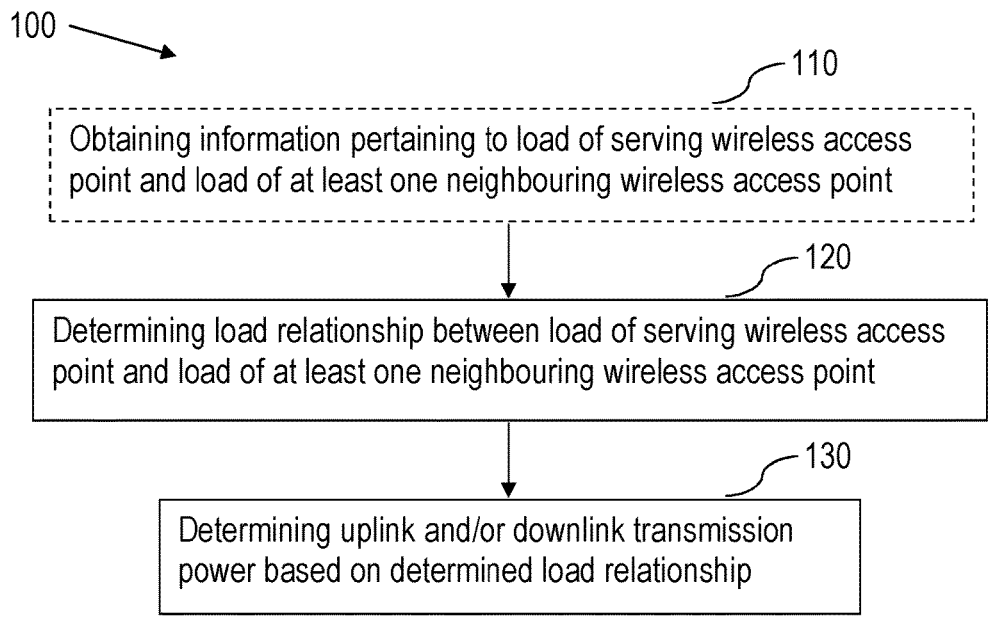
FIG. 1a is a flowchart of a method for uplink and/or downlink power control in a radio communication network according to an exemplifying embodiment.

Embodiments of a method for uplink and/or downlink power control in a radio communication network will now be described with reference to FIG. 1a-f. FIG. 1a is a flowchart of a method for uplink and/or downlink power control in a radio communication network according to an exemplifying embodiment.

FIG. 1a illustrates the method comprising determining 120 a relationship between a load of a serving wireless access point and a load of at least one neighbouring wireless access point; and determining 130 an uplink or downlink transmission power based on the determined load relationship.

As stated above, the method may be performed by a wireless device and/or a wireless access point. The radio communication network may be a heterogeneous or a homogeneous communication network. Thus the wireless device may be located relatively close to the serving wireless access point or relatively far from the serving wireless access point. If the wireless device is located close to the serving wireless access point, relatively low uplink transmission power and/or downlink transmission power may be required for the wireless device and the wireless access point to communicate. Thus, neither uplink nor downlink transmission is likely to cause much interference in neighbouring cells or even at the edge of the cell of the serving access point.

However, in case the wireless device is located relatively close to the cell edge, or cell border, then relatively strong, or high, transmission power may be required both in uplink and in downlink in order for the wireless device and the serving wireless access point to communicate with each other. Further, being close to the cell edge of the serving wireless access point likely means that the wireless device is close to one or more cell edges of neighbouring wireless access points. Thus, if either or both of the wireless device and the serving wireless access point transmit with relatively high transmission power, they may more likely cause interference to the one or more neighbouring wireless access points. The amount of existing interference, or in other words the current interference situation, of the one or more neighbouring wireless access points may vary substantially.

By determining 120 the relationship between the load of the serving wireless access point and the load of at least one neighbouring wireless access point, it is possible for the wireless device and/or the serving wireless access point to conclude or derive information about the amount of load of the serving wireless access point and the amount of load of the one or more neighbouring wireless access points. It may be that the load situation in both the serving and the one or more access points are similar. It may also be that the serving wireless access point experience a substantial higher load that any of the one or more neighbouring wireless access points.

In case the serving wireless access points experience a higher load than any of the one or more neighbouring wireless access points, then the serving wireless access point may not need to consider the interference situation of neighbouring wireless access points as much as if the situation is reversed or all the wireless access points experience a somewhat similar load situation. Generally, the higher the load, the higher the interference.

Thus, based on the determined relationship between the load of the serving wireless access point and the load of the at least one neighbouring wireless access point, the method comprises determining 130 an uplink or downlink transmission power based on the determined load relationship. In this manner, in either or both of uplink and downlink power control, consideration is taken to the load situation of the serving wireless access point and the load of the at least one neighbouring wireless access point. Consequently, consideration may be taken to the amount of interference that a transmission between the serving wireless access point and the wireless device may cause not only in the cell of the serving wireless access point but also in the cells of the one or more neighbouring wireless access points.

The method may have several advantages. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The impact on the current LTE standards is minimal or even none. The solution may be implemented as a proprietary feature. Still further, the solution may be part of Self Organising Network, SON, algorithms.

The load relationship may be determined based on load information of the serving wireless access point and the at least one neighbouring wireless access point respectively.

As explained above, the load relationship is based on load information (also referred to simply as "the load") of the serving wireless access point and the load information of the one or more neighbouring wireless access points.

The load relationship may indicate that the serving and the at least one neighbouring wireless access point experience a similar load, which may be correlated to interference situation. The load relationship may also indicate that the serving wireless access point experiences a higher load than the one or more neighbouring wireless access points, Still further, the load relationship may also indicate that the serving wireless access point experiences a lower load than the one or more neighbouring wireless access points. The load information may thus give an indication of the interference situation for each wireless access point and then the load relationship may thus give an indication of whether the serving wireless access point experiences a similar interference situation as the one or more neighbouring wireless access points, or if the serving wireless access points experience more or less interference than the one or more neighbouring wireless access points.

The method may further comprise obtaining 110 load information of a serving wireless access point and the at least one neighbouring wireless access point.

The load information of the serving wireless access point and the at least one neighbouring wireless access may be obtained differently depending on whether the method is performed by the wireless device or the serving wireless access point.

In case the method is performed by the serving wireless access point, it may know its own load information. Depending on the RAT, the serving wireless access point may obtain load information from the at least one neighbouring wireless access device in different ways. If the RAT employs LTE, then the serving and neighbouring wireless access points may communicate by means of an X2 interface and exchange information regarding load information. If the RAT employs Global System for Mobile communication, GSM, then the serving wireless access point may receive load information regarding neighbouring wireless access points from a Base Station Controller, BSC. If the RAT employs Universal Mobile Telecommunications System, UMTS, then the serving wireless access point may receive load information regarding neighbouring wireless access points from a Radio Network Controller, RNC.

There may be other ways to obtain, or derive, load information of neighbouring wireless access points. One example is to receive load information of the at least one neighbouring wireless access point from the wireless device. The wireless device may receive and measure different pilot signals and/or reference signals broadcasted from the at least one neighbouring wireless access point. Based in these measured pilot signals and/or reference signals, the wireless device may determine e.g. a Signal to Noise and Interference Ratio, SINR, with respect to the measured signals. The wireless device may determine load information for the at least one neighbouring wireless access point based on the determined SINR.

In case the method is performed by the serving wireless device, the wireless device may receive load information from the serving wireless access point. E.g. the serving wireless access point may obtain the load information regarding itself and the at least one neighbouring wireless access point as described above and then inform the wireless device by signalling the information to the wireless device. Alternatively, the wireless device may determine the information as described above by measuring pilot signals and/or reference signals broadcasted from the at least one neighbouring wireless access point and the serving wireless access point.

The load information may pertain to at least one of radio resource utilisation of the serving/neighbouring wireless access nodes; number of wireless devices connected to the serving/neighbouring wireless access nodes; amount of volume in data buffers of the serving/neighbouring wireless access nodes; and indication of an interference situation of the serving and/or neighbouring wireless access nodes.

A wireless access point (the serving and/or the at least one neighbouring) has access to a specific amount of radio resources, also referred to as a total amount of resources (with respect to the wireless access point). Thus the serving and the neighbouring wireless access points may respectively determine e.g. a ratio between used radio resources in relation to the specific (i.e. total) amount of radio resources. This ratio may serve as load information.

A wireless access point may further serve a plurality of individual wireless devices, i.e. have at least a theoretical a maximum number of wireless devices connected to it. All connected wireless devices may of course not engage in the same type of services, or generate the same amount of traffic, but the number of connected wireless devices to a wireless access point may still serve as an indication of the load of the wireless access point, i.e. serve as load information for the wireless access point.

A wireless access point may have one or more processors, memories, buffers and other components carrying out the operation of the wireless access point. Thus, still an option to determine load information for a wireless access point is to determine the amount of volume in data buffers, memories and the like of the wireless access point. Yet an example is to determine the load of the one or more processors of the wireless access point.

As explained above, the amount of interference experienced by a wireless access point may serve as an indication of the load of the wireless access point. Thus, by determining the interference situation of the wireless access point (the serving and/or the at least one neighbouring) load information may be derived based on the interference situation.

The relationship between the load of the serving wireless access point and the load of the at least one neighbouring wireless access point may be determined as a ratio between the load of the serving wireless access point and the load of the at least one neighbouring wireless access point.

The load relationship may be defined or determined as the ratio between the load of the serving wireless access point and the load of the at least one neighbouring wireless access point. The load relationship should reflect the load situation of the serving wireless access point in relation to the load situation of the at least one neighbouring access point. Since the uplink and/or downlink power control takes into consideration whether the serving access point and the at least one neighbouring access point experience a similar load situation or if there is a load imbalance between the different access points, the load relationship should reflect the load balance or load imbalance. By load balance means that the access points experience a somewhat similar load situation and by load imbalance the serving wireless access point either experience higher or lower load than the at least one neighbouring access point. It should be appreciated that load balance does not necessarily imply that the access points experience exactly the same load, but load balance may imply that the difference in the load is e.g. within an area of tolerance or below a threshold.

Figure 1B:
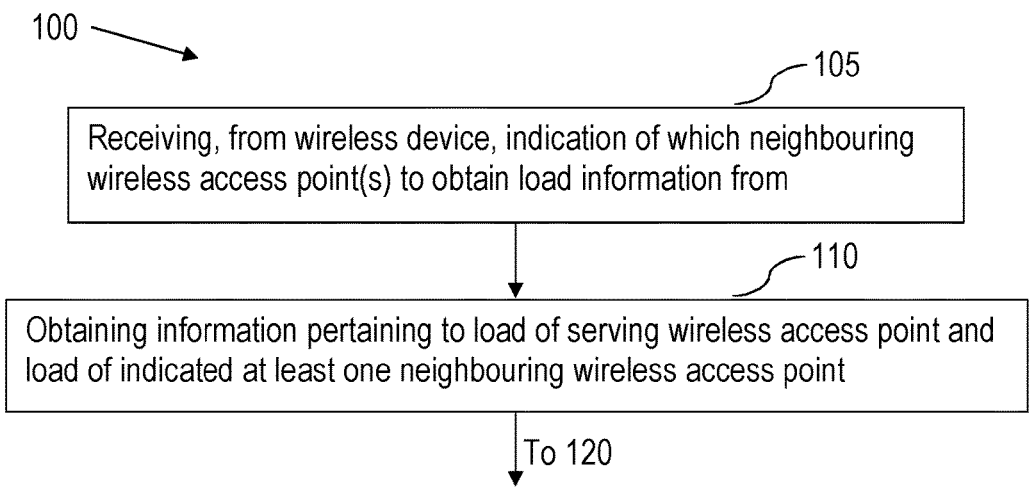
FIG. 1b is a flowchart of a method for uplink and/or downlink power control in a radio communication network according to another exemplifying embodiment.

According to an embodiment, illustrated in FIG. 1b, the method is performed by the serving wireless access point and further comprises receiving 105, from the wireless device, signalling comprising an indication of which neighbouring wireless access point(s) to obtain load information from.

As explained above, the wireless device may receive and measure different pilot signals and/or reference signals broadcasted from the at least one neighbouring wireless access point. Based on these measurements, the wireless device may determine which neighbouring wireless access point(s) may be of interest, e.g. which neighbouring wireless access point(s) are most likely to be affected by too high a transmission power, due to the interference the transmission might cause. Once the wireless device has determined at least one neighbouring wireless access point to obtain load information from, the wireless device signals, to the serving wireless access point, e.g. the id of that or those neighbouring wireless access point(s). Then the serving wireless access point may obtain load information from those neighbouring wireless access points, e.g. by means of an X2 interface or by receiving the information via a BSC or RNC as described above.

Figure 1C:
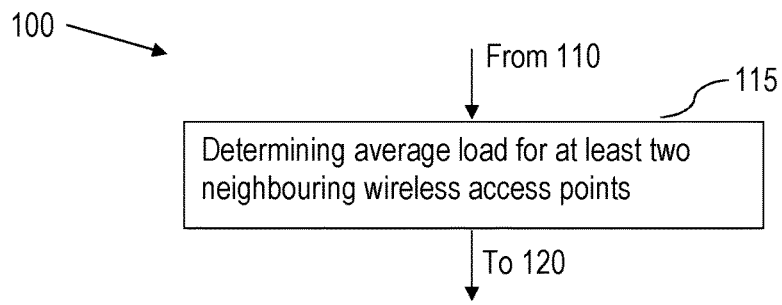
FIG. 1c is a flowchart of a method for uplink and/or downlink power control in a radio communication network according to still an exemplifying embodiment.

According to yet an embodiment, illustrated in FIG. 1c, load information of at least two neighbouring wireless access points is obtained, the method comprising determining 115 an average load for the at least two neighbouring wireless access points, wherein determining 120 the load relationship comprises determining the load relationship between the load of the serving wireless access point and the average load for the at least two neighbouring wireless access point.

This embodiment may be performed by the wireless device or the serving wireless access point. The serving wireless access point may obtain load information from the at least two neighbouring wireless access points as described above, e.g. by means of an X2 interface or by receiving the information via a BSC or RNC. The wireless device may measure pilot and/or reference signals and determine a SINR for each of the at least two neighbouring wireless access points and from the SINRs determine load information as described above.

Once the load information of at least two neighbouring wireless access points is obtained, the average load for the at least two neighbouring wireless access points is determined. As described above, load information may be a ratio or percentage of radio resource utilisation of the serving/neighbouring wireless access nodes, number of wireless devices connected to the wireless access nodes, amount of volume in data buffers of the serving/neighbouring wireless access nodes, and/or indication of an interference situation of the serving and/or neighbouring wireless access nodes. Thus the average ratio or percentage of radio resource utilisation of the at least two neighbouring wireless access nodes is determined, or the average number of wireless devices connected to the at least two neighbouring wireless access nodes is determined and so on.

Merely as an example, assume that load information only relates to a percentage of radio resource utilisation of the at least two neighbouring wireless access nodes. Assume further in this example that one of the neighbouring wireless access node has a radio resource utilisation of 80% of its maximum available radio resources and a second neighbouring wireless access node has a radio resource utilisation of 60% of its maximum available radio resources. Then the average load of the two neighbouring wireless access nodes is 70%.

Once the average load of the at least two neighbouring wireless access nodes is determined, step 115 of FIG. 1c, then the relationship between a load of the serving wireless access point and a load of the at least two neighbouring wireless access points may be determined 120. The load relationship between the serving wireless access point and a load of the at least two neighbouring wireless access points is determined by determining the relationship between load of the serving wireless access point and the average load of the at least two neighbouring wireless access points. It shall be pointed out that there may be more than two neighbouring wireless access points and then the average load of all neighbouring wireless access point is determined.

Figure 1D:
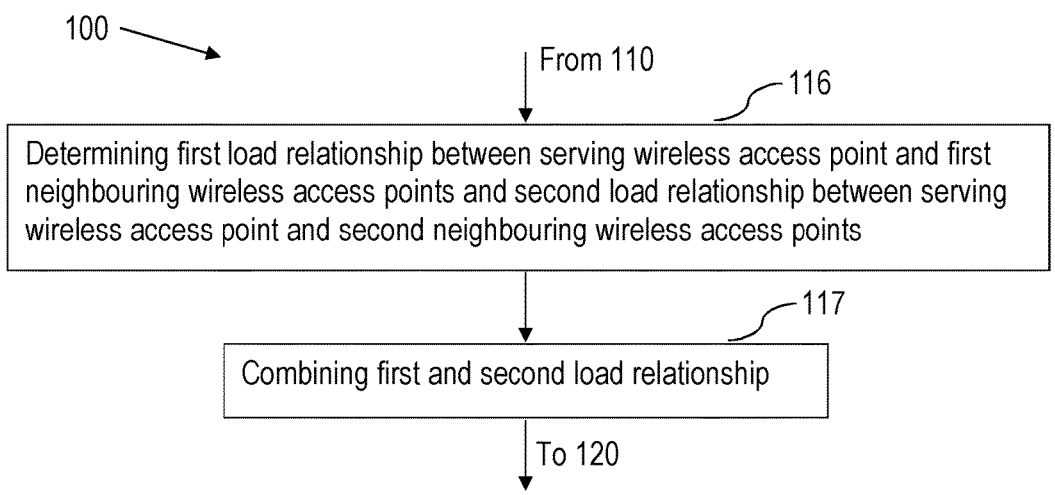
FIG. 1d is a flowchart of a method for uplink and/or downlink power control in a radio communication network according to yet an exemplifying embodiment.
Figure 1E:
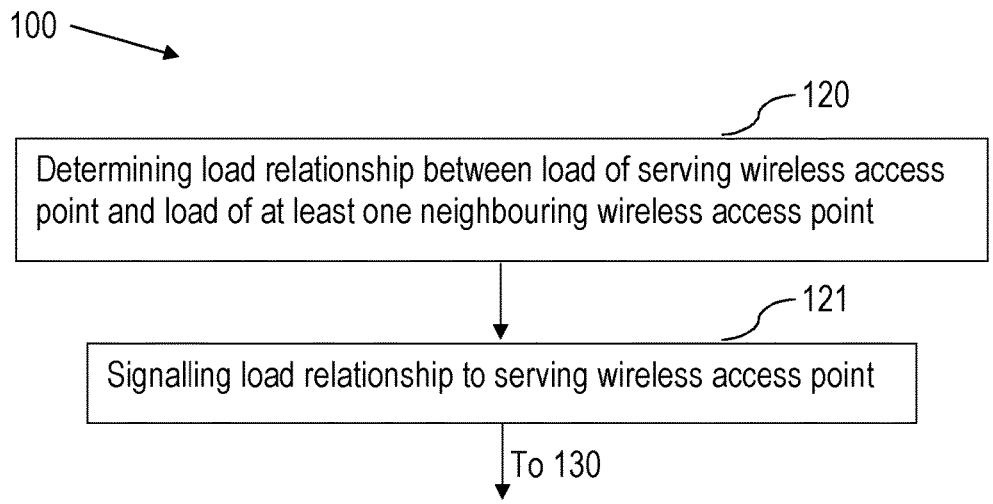
FIG. 1e is a flowchart of a method for uplink and/or downlink power control in a radio communication network according to still another exemplifying embodiment.
Figure 1F:
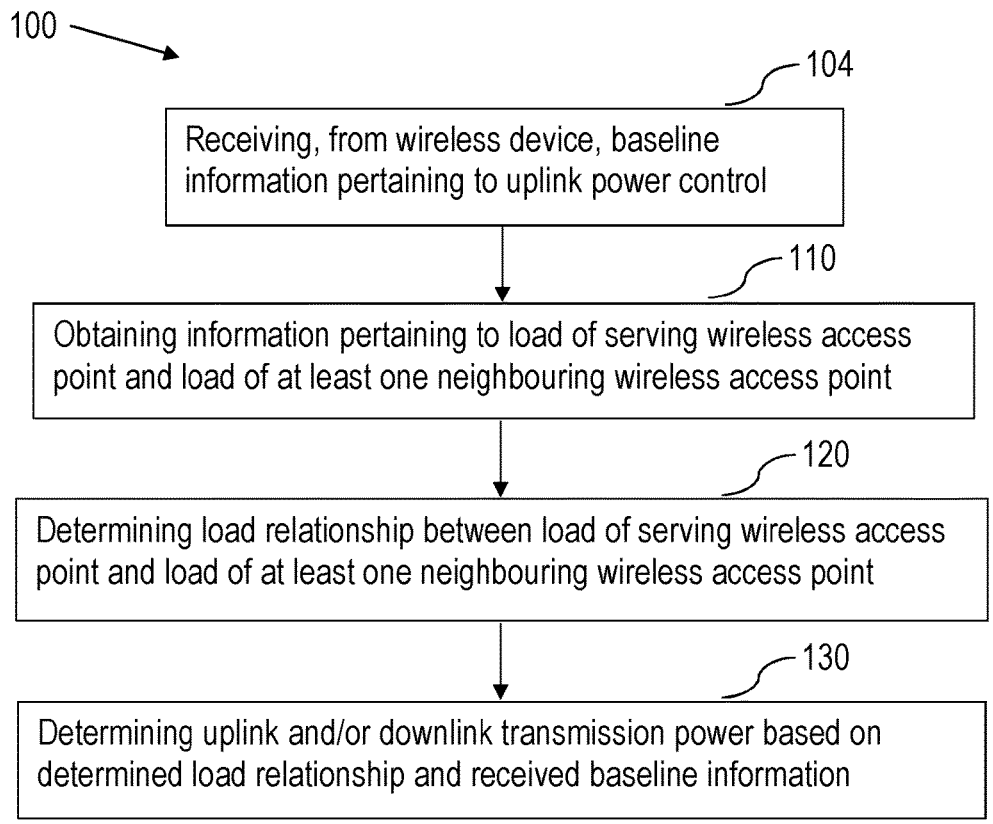
FIG. 1f is a flowchart of a method for uplink and/or downlink power control in a radio communication network according to yet another exemplifying embodiment.

According to yet an embodiment, illustrated in FIG. 1d, load information of at least two neighbouring wireless access points is obtained, the method comprising determining 116 at least a first load relationship between the serving wireless access point and a first neighbouring wireless access point and a second load relationship between the serving wireless access point and a second neighbouring wireless access point, combining 117 the first and the second load relationship, wherein determining 120 the load relationship between the load of the serving wireless access point and the load of the at least two neighbouring wireless access point comprises determining a combined load relationship.

This embodiment may also be performed by the wireless device or the serving wireless access point. The load information of the serving and neighbouring access points may be obtained by the wireless device or the serving wireless access point as described above. The embodiment will be described by an example of only two neighbouring wireless access points.

Once the load, or load information, of the serving and the at least two neighbouring wireless access points have been obtained, a first individual relationship between the load of the serving wireless access point and one of the neighbouring wireless access points is determined. Then a second individual relationship between the load of the serving wireless access point and a second neighbouring wireless access point is determined. Once the two individual load relationships are determined, the load relationship between the serving wireless access point and all the neighbouring wireless access points is determined 120 by combining the individual load relationships, in this example the first and the second individual load relationship. Combining the individual load relationships may comprise determining a function of the individual load relationships possibly being an average value or ratio.

As explained above, load information may comprise an indication of a current load as a ratio of a maximum load.

Merely as an example, load information may pertain to radio resource utilisation of the serving/neighbouring wireless access nodes, number of wireless devices connected to the wireless access nodes, amount of volume in data buffers of the serving/neighbouring wireless access nodes, and/or indication of an interference situation of the serving and/or neighbouring wireless access nodes. In case load information pertains to radio resource utilisation it may be defined or expressed as a ratio of the maximum available radio resources, e.g. 50% of available radio resources are being used, thus the radio resource utilisation is 50% or 0.5. Likewise, in case load information pertains to amount of volume in data buffers, the buffers have a capacity of 100% and the amount of volume in the data buffers may in an example occupy 50% of the total buffer capacity, thus the amount of volume in data buffers is 50% or 0.5. In case load information pertains to indication of an interference situation of wireless access points, then the interference may be determined by a SINR, a Reference Signal Received Power, RSRP, a Reference Signal Received Quality, RSRQ, or a Received Signal Strength Indication, RSSI. All these different measurements or indications of interference situation may be mapped to a load, which then may be expressed as a percentage.

According to an embodiment, determining 130 an uplink transmission power comprises taking into account a received power target, pathloss, pathloss compensation, load of the serving wireless access point, and a load of the neighbouring wireless access points.

There are several factors and parameters to consider when determining a transmission power. At least for the uplink, the transmission power is determined based on at least the received power target, the pathloss and pathloss compensation. The received power target is the target of received Signal to Noise Ratio, SNR. It may be a cell-specific or a user specific parameter. Further, the transmission power is determined based on load of the serving wireless access point, and a load of the neighbouring wireless access points. Thus, the method takes into account how loaded the serving wireless access point is and how loaded the neighbouring wireless access points are. As describe above, depending on if the different access point experience a similar load or if there is a difference between the load of the serving wireless access points and the neighbouring wireless access points, the transmission power may need to be adjusted accordingly. For example, when the serving wireless access point is highly loaded while the neighbour wireless access point is low loaded then the multi-cell load based uplink power control algorithm is configured by increasing the power target by a factor equal to the load imbalance between the serving and the neighbour wireless access point. Assuming that the mean utilisation of the highly loaded serving cell is approximately 60%, while the mean utilisation of the neighbour cell is 10% then the load imbalance is at least $10 \log 10(60/10)=8$ dB. Therefore, multi-cell load based may boost the power target of the specific wireless device, which result in increased transmit power and improved link performance. This in turn may reduce cell utilisation of the serving cell, leading to load balancing between the cells and a better overall system performance.

Determining 130 an uplink transmission power may comprise determining a transmit Power Spectrum Density, $PSD_{TX}$, target by $PSD_{TX}=P_{Baseline}+\Delta(Load_{SC}, Load_{NC_i})$ where $P_{Baseline}$ is the received power target, PL is pathloss, $\alpha$ is the pathloss compensation factor, $Load_{SC}$ is the load of the serving wireless access point, $Load_{NC}$ is the load of the neighbouring wireless access point(s), and $\delta_{CL}$ is a closed loop component.

This is one example of how to determine the uplink transmission power, wherein the $\Delta(\ )$ is a load function with regards to the load of the serving wireless access point and the load of the neighbouring wireless access point(s).

According to an embodiment, wherein the method is performed by the wireless device, the method further comprises signalling 121 the load relationship to the serving wireless access point.

When the wireless device has determined the load relationship and possibly also an uplink transmission power, the method signals 121 the determined load relationship to the serving wireless access point. This enables the serving wireless access point to determine a downlink transmission power based at least partly on the load relationship. Thus the method may be performed both for determining transmission power of downlink and uplink and be performed either by one of, or both, the wireless device and the serving wireless access point.

According to yet an embodiment, wherein the method is performed by the wireless device, further comprising receiving 104 baseline information pertaining to uplink power control from the serving wireless access point, determining 130 the uplink transmission power based on the determined load relationship and on the received information.

In this embodiment, the serving wireless access point signals baseline information to the wireless device. When the wireless device receives 104 the baseline information, the wireless device may determine 130 the uplink transmission power based on the determined load relationship and on the received information, e.g. using the formula described above. Once the wireless device has determined the uplink transmission power, the wireless device may perform an uplink transmission at the determined the uplink transmission power.

Figure 2A:
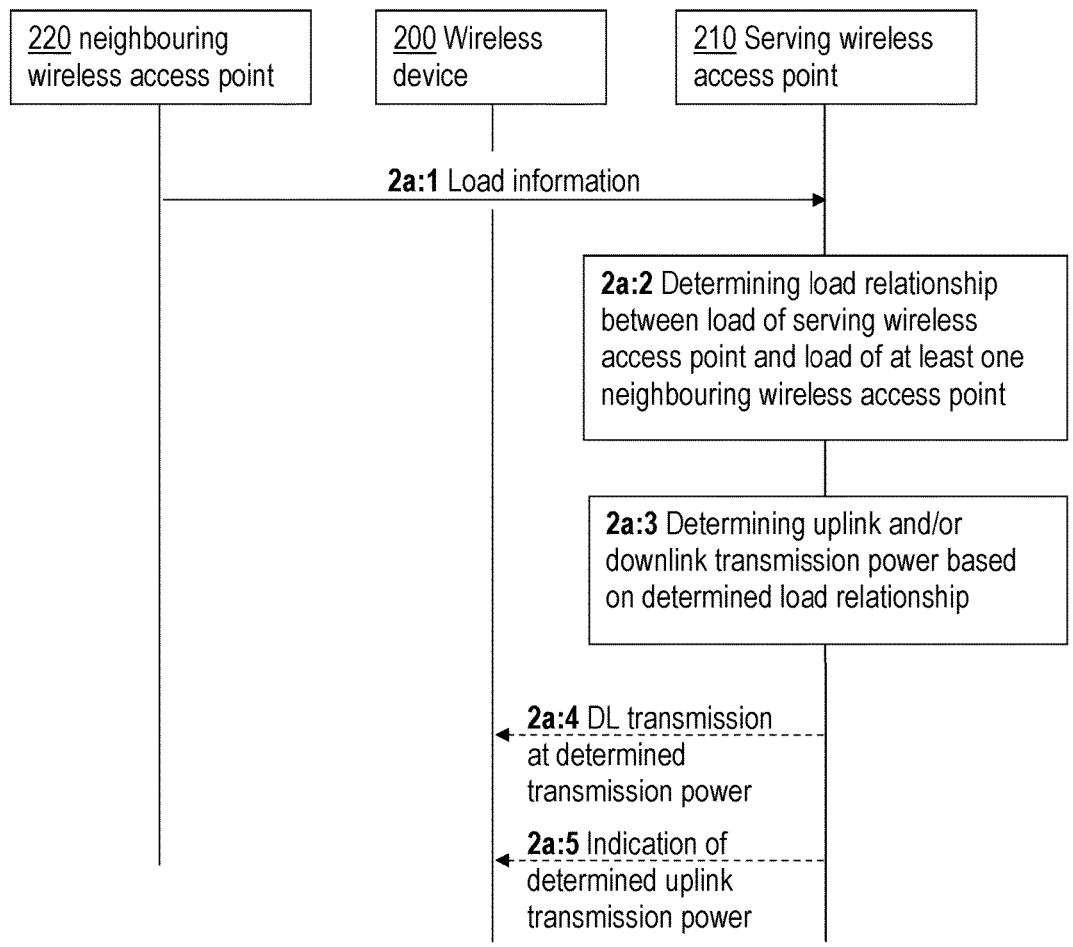
FIG. 2a is a signalling diagram of a method for uplink and/or downlink power control in a radio communication network according to an exemplifying embodiment.

FIG. 2a is a signalling diagram of a method for uplink and/or downlink power control in a radio communication network according to an exemplifying embodiment.

In FIG. 2a, a wireless device 200, a serving wireless access point 210 and a neighbouring wireless access point are illustrated. It shall be pointed out that this is merely an example, and as described above, there may be more than one neighbouring wireless access point. Also in this example, the method is performed by the serving wireless access point 210.

FIG. 2a illustrates the serving wireless access point 210 obtaining 2a:1 load information from the neighbouring wireless access point 220. In this example, the neighbouring wireless access point 220 sends the load information to the serving wireless access point 210. The serving and the neighbouring wireless access point may communicate with each other by means of e.g. an X2-interface or the signal illustrated in FIG. 2a is sent from the neighbouring wireless access point to the serving wireless access point via e.g. a BSC or and RNC.

Once the serving wireless access point 210 obtains the load information of the neighbouring wireless access point 220, the serving wireless access point 210 may determine 2a:2 a load relationship between the load of the serving wireless access point 210 and the neighbouring wireless access point 220. Then the serving wireless access point 210 may determine 2a:3 uplink and/or downlink transmission power based on the determined load relationship.

In case the serving wireless access point 210 determines at least the downlink transmission power, the serving wireless access point 210 performs 2a:4 a downlink transmission to the wireless device 200 with the determined downlink transmission power.

In case the serving wireless access point 210 determines at least the uplink transmission power, the serving wireless access point 210 signals 2a:5 an indication of the determined uplink transmission power to the wireless device 200. The wireless device may then perform an uplink transmission with the determined uplink transmission power as signalled to the wireless device 200.

Figure 2B:
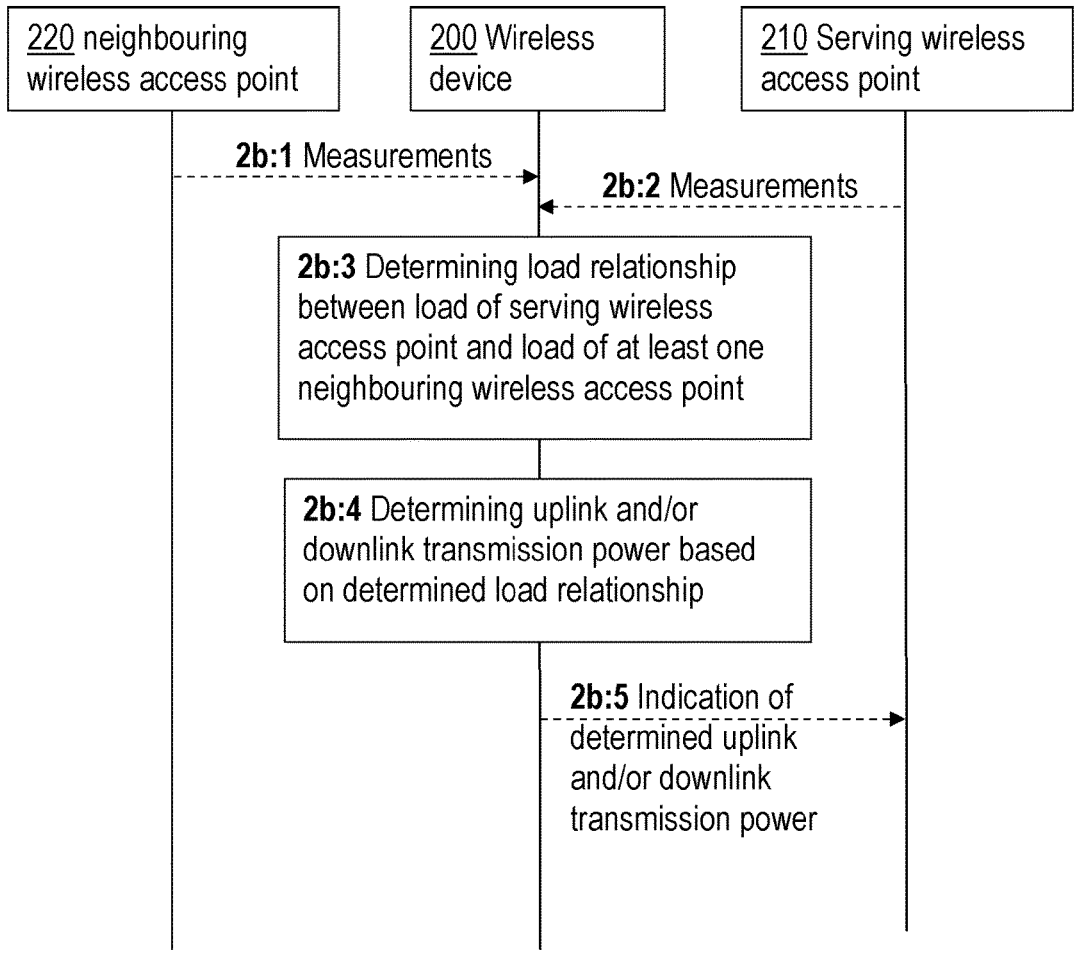
FIG. 2b is a signalling diagram of a method for uplink and/or downlink power control in a radio communication network according to another exemplifying embodiment.

FIG. 2b is a signalling diagram of a method for uplink and/or downlink power control in a radio communication network according to another exemplifying embodiment. It shall be pointed out that this is merely an example, and as described above, there may be more than one neighbouring wireless access point. Also in this example, the method is performed by the wireless device 200.

FIG. 2b illustrates the wireless device receiving pilot and/or reference signals from both the serving and the neighbouring wireless access points. The wireless device performs 2b:1 and 2b:2 measurements on the received pilot and/or reference signals.

The wireless device 200 determines 2b:3 the load relationship between the load of the serving wireless access point 210 and the neighbouring wireless access point 220. Then the wireless device 200 determines 2b:4 uplink and/or downlink transmission power based on the determined load relationship.

The wireless device 200 then signals 2b:5 an indication of the determined uplink and/or downlink power to the serving wireless access point 210.

The wireless device 200 may subsequently perform an uplink transmission to the serving wireless access point 210 with the determined uplink transmission power and the serving wireless access point 210 may perform a downlink transmission to the wireless device 200 with the determined uplink transmission power.

It shall be pointed out that the method may be performed by both the serving wireless access point 210 and the wireless device. If so, when the wireless device 200 send 2b:5 the indication of the determined uplink and/or downlink power to the serving wireless access point 210, the indication may be overruled by the serving wireless access point 210. The wireless access point 210, also performing the method, may see the indication from the wireless device 200 merely as a recommendation and the serving wireless access point 210 may or may not approve the indication of uplink and downlink transmission power received from the wireless device 200.

Embodiments herein also relate to an apparatus adapted for uplink and/or downlink power control in a radio communication network. The apparatus has the same objects, technical features and advantages as the method performed by the apparatus. The apparatus will only be described in brief in order to avoid unnecessary repetition.

Figure 3:
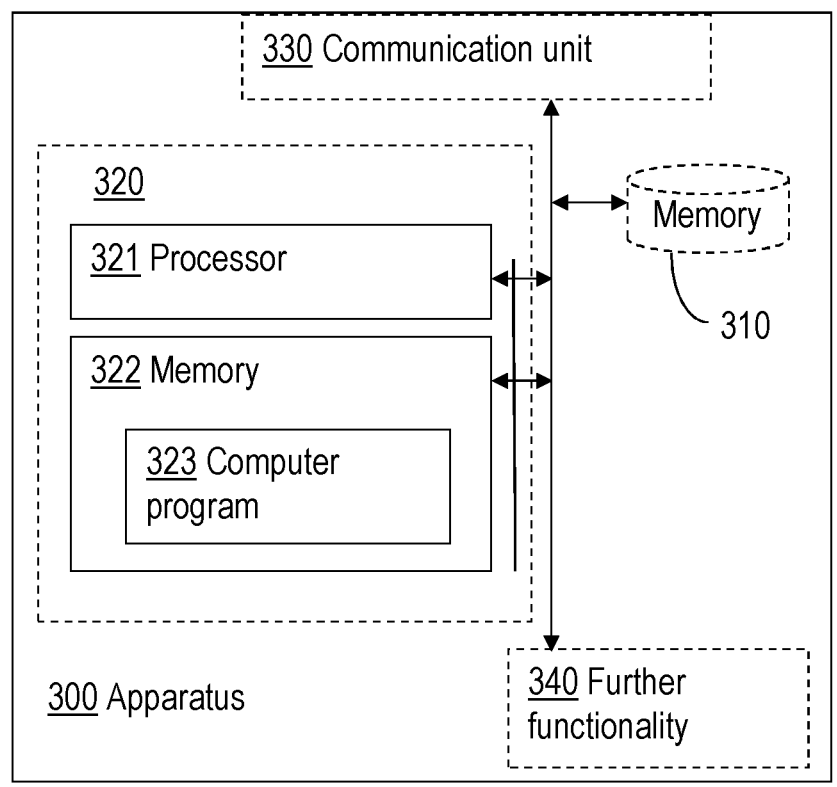
FIG. 3 is a block diagram of an apparatus adapted for uplink and/or downlink power control in a radio communication network according to an exemplifying embodiment.

FIG. 3 is a block diagram of an apparatus adapted for uplink and/or downlink power control in a radio communication network according to an exemplifying embodiment. FIG. 3 illustrates the apparatus comprising a processor 321 and a memory 322, the memory comprising instructions which when executed by the processor causes the apparatus 300 to determine a relationship between a load of a serving wireless access point and a load of at least one neighbouring wireless access point; and to determine an uplink or downlink transmission power based on the determined load relationship.

The apparatus has the same possible advantages as the method performed by the apparatus. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The impact on the current LTE standards is minimal or even none. The solution may be implemented as a proprietary feature. Still further, the solution may be part of Self Organising Network, SON, algorithms.

The load relationship may be determined based on load information of the serving wireless access point and the at least one neighbouring wireless access point respectively.

The memory 322 may further comprise instructions which when executed by the processor 321 causes the apparatus 300 to obtain load information of a serving wireless access point and the at least one neighbouring wireless access point.

Load information may pertain to at least one of radio resource utilisation of the serving/neighbouring wireless access nodes; number of wireless devices connected to the serving/neighbouring wireless access nodes; amount of volume in data buffers of the serving/neighbouring wireless access nodes; and indication of an interference situation of the serving and/or neighbouring wireless access nodes.

The relationship between the load of the serving wireless access point and the load of the at least one neighbouring wireless access point may be determined as a ratio between the load of the serving wireless access point and the load of the at least one neighbouring wireless access point.

According to an embodiment, the apparatus is the serving wireless access point, wherein the memory 322 further comprises instructions which when executed by the processor 321 causes the apparatus 300 to receive, from the wireless device, signalling comprising an indication of which neighbouring wireless access point(s) to obtain load information from.

According to still an embodiment, load information of at least two neighbouring wireless access points is obtained, wherein the memory 322 further comprises instructions which when executed by the processor 321 causes the apparatus 300 to determine an average load for the at least two neighbouring wireless access points, wherein determining the load relationship comprises determining the load relationship between the load of the serving wireless access point and the average load for the at least two neighbouring wireless access point.

According to yet an embodiment, load information of at least two neighbouring wireless access points is obtained, wherein the memory 322 further comprises instructions which when executed by the processor 321 causes the apparatus 300 to determine at least a first load relationship between the serving wireless access point and a first neighbouring wireless access point and a second load relationship between the serving wireless access point and a second neighbouring wireless access point, and to combine the first and the second load relationship, wherein determining the load relationship between the load of the serving wireless access point and the load of the at least two neighbouring wireless access point comprises determining a combined load relationship.

Load information may comprise an indication of a current load as a ratio of a maximum load.

Determining an uplink transmission power may comprise taking into account a received power target, pathloss, pathloss compensation, load of the serving wireless access point, and a load of the neighbouring wireless access points.

Determining 130 an uplink transmission power may comprise determining a transmit Power Spectrum Density, $PSD_{TX}$, target by $PSD_{TX}=P_{Baseline}+\Delta(Load_{SC}, Load_{NC_i})$ where $P_{Baseline}$ is the received power target, PL is pathloss, $\alpha$ is the pathloss compensation factor, $Load_{SC}$ is the load of the serving wireless access point, $Load_{NC}$ is the load of the neighbouring wireless access point(s), and $\delta_{CL}$ is a closed loop component.

According to an embodiment, wherein the apparatus is the wireless device, the memory 322 further comprises instructions which when executed by the processor 321 causes the apparatus 300 to signal the load relationship to the serving wireless access point.

According to an embodiment, wherein the apparatus is the wireless device, the memory 322 further comprises instructions which when executed by the processor 321 causes the apparatus 300 to receive baseline information pertaining to uplink power control from the serving wireless access point, and to determine the uplink transmission power based on the determined load relationship and on the received information.

Embodiments herein also relate to an apparatus for uplink and/or downlink power control in a radio communication network. The apparatus has the same objects, technical features and advantages as the method performed by the apparatus. The apparatus will only be described in brief in order to avoid unnecessary repetition.

Figure 4:
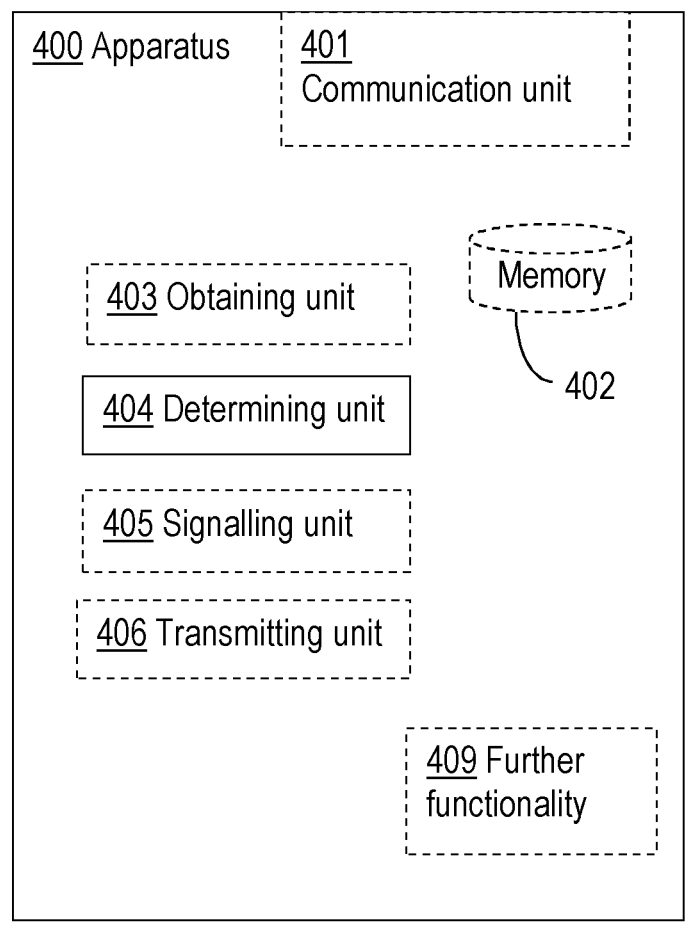
FIG. 4 is a block diagram of an apparatus for uplink and/or downlink power control in a radio communication network according to an exemplifying embodiment.

FIG. 4 is a block diagram of an apparatus for uplink and/or downlink power control in a radio communication network according to an exemplifying embodiment. FIG. 4 illustrates the apparatus comprising a determining unit 404 for determining a relationship between a load of a serving wireless access point and a load of at least one neighbouring wireless access point, and for determining an uplink or downlink transmission power based on the determined load relationship.

The apparatus has the same possible advantages as the method performed by the apparatus. One possible advantage is that the overall interference situation of several cells, or wireless access points, may be considered. Another possible advantage is that the overall throughput of the network may be improved. Still another possible advantage is that the number of dropped calls due to high interference and thus lost radio connection may be reduced. Further, power and spectrum efficiency may be increased. Neighbour aware power control is provided in order to minimise excessive interference to heavily loaded neighbour cells and coordination between wireless access points may be provided. The impact on the current LTE standards is minimal or even none. The solution may be implemented as a proprietary feature. Still further, the solution may be part of Self Organising Network, SON, algorithms.

In FIGS. 3 and 4, apparatus 300, 400 is also illustrated comprising a communication unit 330 and 401. Through the communication unit, the apparatus 300, 400 is adapted to communicate with other nodes and/or entities in the wireless communication network. The communication unit 330, 401 may comprise more than one receiving arrangement. For example, the receiving unit may be connected to both a wire and an antenna, by means of which the apparatus 300, 400 is enabled to communicate with other nodes and/or entities in the wireless communication network. Similarly, the communication unit 330, 401 may comprise more than one transmitting arrangement, which in turn are connected to both a wire and an antenna, by means of which the apparatus 300, 400 is enabled to communicate with other nodes and/or entities in the wireless communication network. The apparatus 300, 400 further comprises a memory 310, 322, 402 for storing data. Further, the apparatus 400 may further comprise a control unit or processing unit which in turns is connected to the different units 403-406. It shall be pointed out that this is merely an illustrative example and the apparatus 400 may comprise more, less or other units or modules which execute the functions of the apparatus 400 in the same manner as the units illustrated in FIG. 4.

It should be noted that FIG. 4 merely illustrates various functional units in the apparatus 400 in a logical sense. The functions in practice may be implemented using any suitable software and hardware means/circuits etc. Thus, the embodiments are generally not limited to the shown structures of the apparatus 400 and the functional units. Hence, the previously described exemplary embodiments may be realised in many ways. For example, one embodiment includes a computer-readable medium having instructions stored thereon that are executable by the control or processing unit for executing the method steps in the apparatus 400. The instructions executable by the computing system and stored on the computer-readable medium perform the method steps of the apparatus 400 as set forth in the claims.

Figure 5:
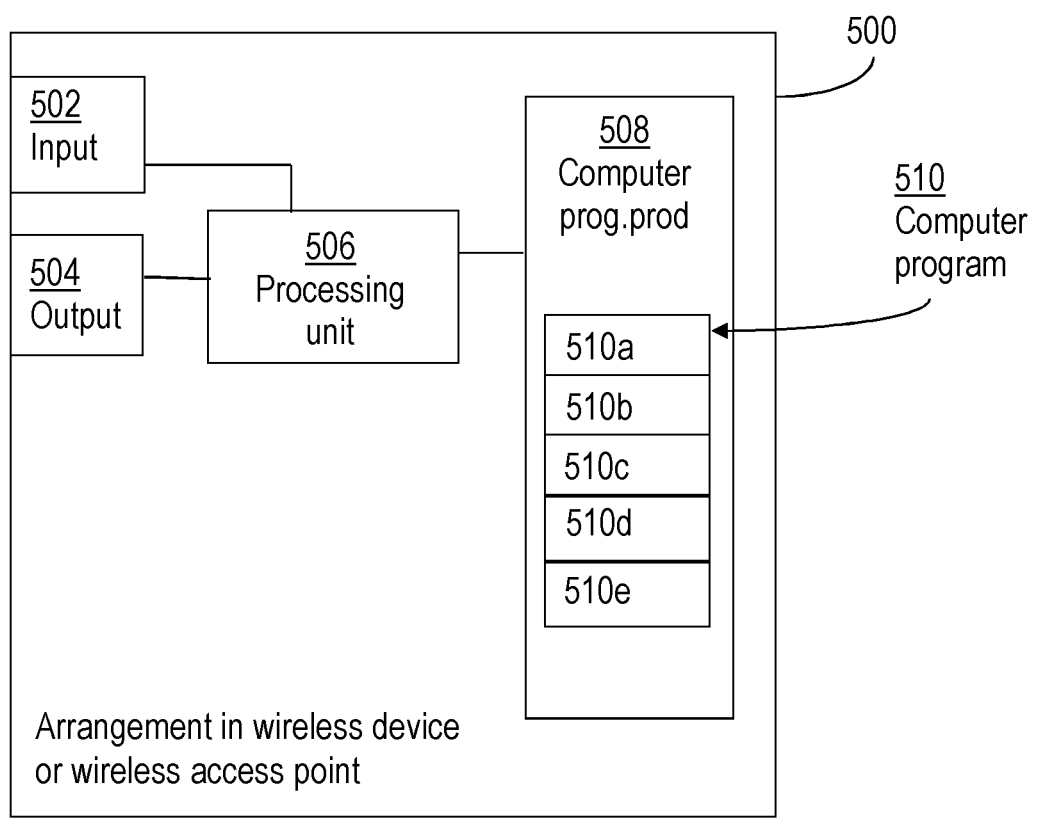
FIG. 5 is a block diagram of an arrangement in wireless device or wireless access point for uplink and/or downlink power control in a radio communication network according to an exemplifying embodiment.

FIG. 5 schematically shows an embodiment of an arrangement in an apparatus 500. Comprised in the apparatus 500 are here a processing unit 506, e.g. with a DSP (Digital Signal Processor). The processing unit 506 may be a single unit or a plurality of units to perform different actions of procedures described herein. The apparatus 500 may also comprise an input unit 502 for receiving signals from other entities, and an output unit 504 for providing signal(s) to other entities. The input unit and the output unit may be arranged as an integrated entity or as illustrated in the example of FIG. 3 and, as one or more interfaces 330, 401.

Furthermore, the apparatus 500 comprises at least one computer program product 508 in the form of a non-volatile memory, e.g. an EEPROM (Electrically Erasable Programmable Read-Only Memory), a flash memory and a hard drive. The computer program product 508 comprises a computer program 510, which comprises code means, which when executed in the processing unit 506 in the apparatus 500 causes the apparatus 500 to perform the actions e.g. of the procedure described earlier in conjunction with FIG. 1a.

The computer program 510 may be configured as a computer program code structured in computer program modules 510a-510e. Hence, in an exemplifying embodiment, the code means in the computer program of the apparatus 500 comprises a determining unit, or module, for determining a relationship between a load of a serving wireless access point and a load of at least one neighbouring wireless access point, and for determining an uplink or downlink transmission power based on the determined load relationship.

The computer program modules could essentially perform the actions of the flow illustrated in FIG. 1a, to emulate the apparatus 500. In other words, when the different computer program modules are executed in the processing unit 506, they may correspond to the unit 404 of FIG. 4.

Although the code means in the respective embodiments disclosed above in conjunction with FIG. 4 are implemented as computer program modules which when executed in the respective processing unit causes the apparatus to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the apparatus.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method for uplink power control in a radio communication network, the method comprising:
   determining a relationship between a load of a serving wireless access point and a load of at least one neighboring wireless access point, wherein load information of at least two neighboring wireless access points is considered in determining said relationship, and
   determining an uplink transmission power for a wireless device served by the serving wireless access point, based on the determined load relationship.

2. The method of claim 1, wherein the load relationship is determined based on load information of the serving wireless access point and the at least two neighboring wireless access points respectively.

3. The method of claim 1, further comprising obtaining load information of a serving wireless access point and the at least two neighboring wireless access points.

4. The method of claim 2, wherein the load information pertains to at least one of: radio resource utilization of the serving/neighboring wireless access nodes; number of wireless devices connected to the serving/neighboring wireless access nodes; amount of volume in data buffers of the serving/neighboring wireless access nodes; and indication of an interference situation of the serving and/or neighboring wireless access nodes.

5. The method of claim 1, wherein the relationship between the load of the serving wireless access point and the load of the at least one neighboring wireless access point is determined as a ratio between the load of the serving wireless access point and an average of the load of the at least two neighboring wireless access points.

6. The method of claim 1, wherein the method is performed by the serving wireless access point, further comprising receiving, from the wireless device, signaling comprising an indication of which neighboring wireless access point(s) to obtain load information from.

7. The method of claim 1, wherein load information of at least two neighboring wireless access points is obtained, the method comprising determining an average load for the at least two neighboring wireless access points, wherein determining the load relationship comprises determining the load relationship between the load of the serving wireless access point and the average load for the at least two neighboring wireless access point.

8. The method of claim 1, wherein load information of at least two neighboring wireless access points is obtained, the method comprising determining at least a first load relationship between the serving wireless access point and a first neighboring wireless access point and a second load relationship between the serving wireless access point and a second neighboring wireless access point, combining the first and the second load relationship, wherein determining the load relationship between the load of the serving wireless access point and the load of the at least two neighboring wireless access point comprises determining a combined load relationship.

9. The method of claim 1, wherein load information comprises an indication of a current load as a ratio of a maximum load.

10. The method of claim 1, wherein determining the uplink transmission power comprises taking into account a received power target, pathloss, pathloss compensation, load of the serving wireless access point, and a load of the neighboring wireless access points.

11. The method of claim 10, wherein determining the uplink transmission power comprises determining a transmit Power Spectrum Density, $PSD_{TX}$, target by $PSD_{TX}=P_{Baseline}+\Delta(Load_{SC}, Load_{NC_j})$ where $P_{Baseline}$ is the received power target, $Load_{SC}$ is the load of the serving wireless access point, $Load_{NC}$ is the load of the neighboring wireless access point(s), and $\Delta(Load_{SC}, Load_{NC_j})$ is a load function with regards to the load of the serving wireless access point and the load of the neighboring wireless access point(s).

12. The method of claim 1, wherein the method is performed by the wireless device, further comprising signaling the load relationship to the serving wireless access point.

13. The method of claim 1, wherein the method is performed by the wireless device, further comprising receiving baseline information pertaining to uplink power control from the serving wireless access point, determining the uplink transmission power based on the determined load relationship and on the received information.

14. An apparatus adapted for uplink power control in a radio communication network, the apparatus comprising a processor and a memory, the memory comprising instructions that when executed by the processor causes the apparatus to:
determine a relationship between a load of a serving wireless access point and a load of at least one neighboring wireless access point, such that load information of at least two neighboring wireless access points is considered in determining said relationship, and
determine an uplink transmission power for a wireless device served by the serving wireless access point, based on the determined load relationship.

15. The apparatus of claim 14, wherein the load relationship is determined based on load information of the serving wireless access point and the at least two neighboring wireless access points respectively.

16. The apparatus of claim 14, wherein the memory further comprises instructions that when executed by the processor causes the apparatus to obtain load information of a serving wireless access point and the at least two neighboring wireless access points.

17. The apparatus of claim 15, wherein the load information pertains to at least one of: radio resource utilization of the serving/neighboring wireless access nodes; number of wireless devices connected to the serving/neighboring wireless access nodes; amount of volume in data buffers of the serving/neighboring wireless access nodes; and indication of an interference situation of the serving and/or neighboring wireless access nodes.

18. The apparatus of claim 14, wherein the relationship between the load of the serving wireless access point and the load of the at least one neighboring wireless access point is determined as a ratio between the load of the serving wireless access point and an average of the load of the at least one neighboring wireless access point.

19. The apparatus of claim 14, wherein the apparatus is the serving wireless access point, wherein the memory further comprises instructions that when executed by the processor causes the apparatus to receive, from the wireless device, signaling comprising an indication of which neighboring wireless access point(s) to obtain load information from.

20. The apparatus of claim 14, wherein load information of at least two neighboring wireless access points is obtained, wherein the memory further comprises instructions that when executed by the processor causes the apparatus to determine an average load for the at least two neighboring wireless access points, wherein determining the load relationship comprises determining the load relationship between the load of the serving wireless access point and the average load for the at least two neighboring wireless access point.

21. The apparatus of claim 14, wherein load information of at least two neighboring wireless access points is obtained, wherein the memory further comprises instructions that when executed by the processor causes the apparatus to determine at least a first load relationship between the serving wireless access point and a first neighboring wireless access point and a second load relationship between the serving wireless access point and a second neighboring wireless access point, and to combine the first and the second load relationship, wherein determining the load relationship between the load of the serving wireless access point and the load of the at least two neighboring wireless access point comprises determining a combined load relationship.

22. The apparatus of claim 14, wherein load information comprises an indication of a current load as a ratio of a maximum load.

23. The apparatus of claim 14, wherein determining the uplink transmission power comprises taking into account a received power target, pathloss, pathloss compensation, load of the serving wireless access point, and a load of the neighboring wireless access points.

24. The apparatus of claim 23, wherein determining the uplink transmission power comprises determining a transmit Power Spectrum Density, $PSD_{TX}$, target by $PSD_{TX}=P_{Baseline}+\Delta(Load_{SC}, Load_{NC_j})$ where $P_{Baseline}$ is the received power target, $Load_{SC}$ is the load of the serving wireless access point, $Load_{NC}$ is the load of the neighboring wireless access point(s), and $\Delta(Load_{SC}, Load_{NC_j})$ is a load function with regards to the load of the serving wireless access point and the load of the neighboring wireless access point(s).

25. The apparatus of claim 14, wherein the apparatus is the wireless device, wherein the memory further comprises instructions that when executed by the processor causes the apparatus to signal the load relationship to the serving wireless access point.

26. The apparatus of claim 14, wherein the apparatus is the wireless device, wherein the memory further comprises instructions that when executed by the processor causes the apparatus to receive baseline information pertaining to uplink power control from the serving wireless access point, and to determine the uplink transmission power based on the determined load relationship and on the received information.

* * * * *